2,790,801

PROCESS FOR THE PREPARATION OF CYANURIC ACID FROM UREA

Gerlando Marullo and Alessandro Baroni, Novara, and Tiziano Garlanda, Torino, Italy, assignors to Montecatini, Società Generale per l'Industria Mineraria e Chimica-Milan, a corporation of Italy No Drawing. Application June 24, 1955,
Serial No. 517,904

Claims priority, application Italy July 1, 1954

2 Claims. (Cl. 260—248)

The present invention relates to a process for the preparation of cyanuric acid from urea.

Various methods have been disclosed in the past for the production of cyanuric acid. Thus, cyanuric acid has been made by means of hydrolyzing cyanuryl chloride, or by reacting a potassium cyanate solution with dilute acetic acid which leads to the formation of monopotassium cyanurate

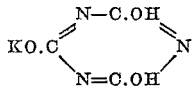

from which cyanuric acid is liberated by the action of mineral acids. Other methods include heating the crude reaction product between phosgene and ammonia to about 200° C., or treating urea with chlorine at 130–140° C., or with anhydrous zinc chloride at 170–220° C. However, all these methods result in low yields and require relatively complex equipment. The same may be said of two still other processes, according to one of which allophanic acid chloride as starting material is heated in an inert solvent for several hours to 290° C., and according to the other, urea is fused at 200–250° C. with large quantities of an ammonium halide.

Now we have found that, if urea is mixed with sulfuric acid and the mixture is heated to about 200° C., urea is converted to cyanuric acid at very high yields. More particularly, we have found that, if the semi-solid mass, obtained upon heating urea with sulfuric acid to 120–140° C., is heated subsequently to 150–200° C., a complete conversion of the free urea to cyanuric acid is obtained, at yields higher than 90%, even if only small amounts of sulfuric acid are used, which may, therefore, be presumed to exert a catalytic action on the cyclization of urea to cyanuric acid.

Aside from enabling us to prepare cyanuric acid at high yields, the process has the additional advantage of requiring only simple equipment, since it can be conducted by heating and stirring the reagents at normal pressure. A quantity of ammonia evolves thereby which corresponds to the quantity of cyanuric acid formed. Because of the low operating temperature of maximum 200° C. in comparison to hitherto known processes and the fact that the gaseous reaction products can be removed as they are formed, the new method does not require the use of particularly corrosion-resistant apparatus. In fact, it is possible to carry out the process in simply enameled or glass-lined reactors, and the use of more expensive silver-plated equipment or equipment lined with special alloys, such as Hastelloy, etc., is not necessary.

As final reaction products, cyanuric acid and ammonium sulfate in powdery form are obtained, which are easily discharged and separated by elution with water, cyanuric acid being substantially insoluble in water at room temperature.

The cyanuric acid obtained according to the above-indicated process is sufficiently pure for normal commercial use. For example, it can be converted to melamine by heating with ammonia, or it can be used in the production of resinous products, aliphatic nitriles, etc.

Example 1

A mixture of 3 mols of urea and 1.5 mols of sulfuric acid (for example of 66° Bé.) is heated slowly to 120–140° C. while stirring. Carbon dioxide evolves and the temperature rises spontaneously to 160° C. The semi-solid mass obtained is then heated to 200° C. for five hours. At this stage, evolution of ammonia is observed. The reaction product is left to cool, and is then extracted with one liter of boiling water. Upon cooling, an ammonium sulfate solution and an insoluble residue are obtained which are separated by filtration. The insoluble, crystalline residue, which weights 64 g., has a nitrogen content of 31.1% (theoretical for cyanuric acid 32.54%).

Inasmuch as theoretically from 1.5 mols of urea available (1.5 mols being converted to ammonium sulfate by 1.5 mols of sulfuric acid) 64.5 g. of cyanuric acid should form, the yield is 99.2%.

Example 2

Proceeding as described in Example 1, but using 4 mols of urea and 1.5 mols of sulfuric acid, 106 g. of cyanuric acid are obtained, as against a theoretical amount of 107 g. The yield is, therefore, 99%.

Example 3

A mixture of 1.5 mols of sulfuric acid and 9 mols of urea is treated as described in the preceding examples. 320 g. of cyanuric acid are obtained. Since the theoretical amount is 322.5 g., the yield in this case is 99.2%.

Example 4

The process of the preceding examples is repeated, but using a mixture of 30 mols of urea and 1.5 mols of sulfuric acid. 1105 g. of cyanuric acid are obtained, which corresponds to 90% of the theoretically obtainable yield (1225 g.).

Example 5

Proceeding as described in the preceding examples, except that a mixture of 150 mols of urea and 1.5 mols of sulfuric acid is used, 5748 g. of cyanuric acid are obtained, which correspond to 90% of the theoretically obtainable yield (6387 g.). The nitrogen content of the product is 31%.

We claim:

1. A process for the preparation of cyanuric acid from urea, which comprises mixing 100 mol equivalents of urea with an amount of 66 Bé. sulfuric acid comprised between 1 and 50 mol equivalents, heating slowly to 180–200° C., maintaining this temperature until evolution of ammonia has ceased, cooling the reaction mass and isolating cyanuric acid by extracting ammonium sulphate contained in the reaction mass with boiling water and separating the crystalline residue from the solution.

2. A process for the preparation of cyanuric acid from urea, which comprises mixing 100 mol equivalents of urea with about 1 mol equivalent of 66° Bé. sulfuric acid, heating slowly to 120–140° C. while stirring, heating for about five hours to 180–200° C., removing ammonia evolving from the reaction mixture, extracting the reaction product with boiling water, cooling to about room temperature and separating the crystalline residue from the solution.

References Cited in the file of this patent

Berichte: 34 (1901), pp. 2674–2675.
Werner: "Chemistry of Urea," 1923, p. 31.
Dumas: Annales de Chemie et Physique, 1830, vol. 44, pp. 273–278.